(12) United States Patent
Newman et al.

(10) Patent No.: US 7,146,608 B1
(45) Date of Patent: Dec. 5, 2006

(54) METHOD AND SYSTEM FOR A SOFTWARE RELEASE PROCESS

(75) Inventors: Alan Newman, Los Altos, CA (US); Eugene J. Peterson, Los Gatos, CA (US); Daniel M. Oberrotman, Los Gatos, CA (US)

(73) Assignee: Cisco Technology, Inc., San Jose, CA (US)

( * ) Notice: Subject to any disclaimer, the term of this patent is extended or adjusted under 35 U.S.C. 154(b) by 628 days.

(21) Appl. No.: 09/407,531

(22) Filed: Sep. 28, 1999

(51) Int. Cl.
*G06F 9/45* (2006.01)

(52) U.S. Cl. .................................... 717/168
(58) Field of Classification Search .............. 717/170
See application file for complete search history.

(56) References Cited

U.S. PATENT DOCUMENTS

| | | | | |
|---|---|---|---|---|
| 4,558,413 A | | 12/1985 | Schmidt et al. | 717/110 |
| 4,875,162 A | * | 10/1989 | Ferriter et al. | 705/29 |
| 4,912,637 A | | 3/1990 | Sheedy et al. | 707/203 |
| 5,339,430 A | * | 8/1994 | Lundin et al. | 717/170 |
| 5,481,722 A | | 1/1996 | Skinner | 717/122 |
| 5,499,295 A | | 3/1996 | Cooper | 713/156 |
| 5,649,200 A | * | 7/1997 | Leblang et al. | 717/122 |
| 5,675,802 A | * | 10/1997 | Allen et al. | 717/103 |
| 5,732,275 A | * | 3/1998 | Kullick et al. | 717/170 |
| 5,809,287 A | * | 9/1998 | Stupek, Jr. et al. | 717/170 |
| 5,845,128 A | * | 12/1998 | Noble et al. | 717/170 |
| 5,903,897 A | * | 5/1999 | Carrier, III et al. | 707/203 |
| 5,907,705 A | | 5/1999 | Carter | 717/122 |
| 5,909,581 A | * | 6/1999 | Park | 717/170 |
| 5,956,513 A | * | 9/1999 | McLain, Jr. | 717/170 |
| 6,023,702 A | * | 2/2000 | Leisten et al. | 707/100 |
| 6,073,214 A | * | 6/2000 | Fawcett | 711/133 |
| 6,223,343 B1 | * | 4/2001 | Hopwood et al. | 717/101 |
| 6,256,773 B1 | * | 7/2001 | Bowman-Amuah | 717/121 |
| 6,263,497 B1 | * | 7/2001 | Maeda et al. | 717/170 |
| 6,289,509 B1 | * | 9/2001 | Kryloff | 717/170 |
| 2002/0002704 A1 | * | 1/2002 | Davis et al. | 717/170 |

OTHER PUBLICATIONS

Hutton, Mananging Various Levels . . . , 1988, IEEE, p. 177-184.*
Skinner, Automated Software Control, undated, ACM, p. 195-201.*
Hall et al., A Cooperative Approach to Support Software Development . . . , 1999, ACM, p. 174-183.*
Hazeyama et al., A Problem Report Management System . . . , IEEE, 1999, p. 1019-1024.*
Bicknell, Software Development and Configuration Management . . . , IEEE, 1988, p. 143-147.*

(Continued)

*Primary Examiner*—John Chavis
(74) *Attorney, Agent, or Firm*—Hickman Palermo Truong & Becker, LLP

(57) ABSTRACT

The present invention provides a system and method of using highly structured program testing, regression testing, final test and fix procedures and commit procedures at the levels of the Business Unit, at an intermediate pre-integration branch level and finally at a primary technology branch of the current IOS source code system before final system testing is performed as an antecedent to a regular release of a new version of the IOS regularly, approximately every 8 weeks. New features and functions are accommodated in this 8 week release cycle by a process of alternating "fat" and "thin" releases which contain many and few new features respectively. Moreover, in the preferred embodiment which incorporates this rigorous process, no more than three generations of the main branches of the IOS source code are maintained at any one time.

15 Claims, 9 Drawing Sheets

OTHER PUBLICATIONS

Doering, A Comprehensive Planning and Control Tool . . . , IEEE, 1992, p. 587-591.*
Heimann et al., An Environment for Managing Software . . . , IEEE, 1997, p. 101-109.*
Carmel et al., A Process Model . . . , IEEE, 1995, p. 50-61.*
Mahler et al., Integrating Configuration Management . . . , ACM, 1990, p. 229-237.*
Atkins et al., Using Version Control . . . , ACM, 199, p. 324-333.*
Pfleeger, The Nature of System Change, IEEE, 1998, p. 87-90.*
Carter et al., Techniques for Reducing Consistency Related Communication . . . , ACM, 1995, p. 205-243.*
Leinwald et al., "Cisco Router Configuration", Maxmillian Technical Publishing, Indianapolis, IN, for Cisco Press, ISBN 1-57870-022-1 (1998). (Table of Contents and Chapter One submitted herewith).

* cited by examiner

FIG._1

200 Typical General Purpose Computer/

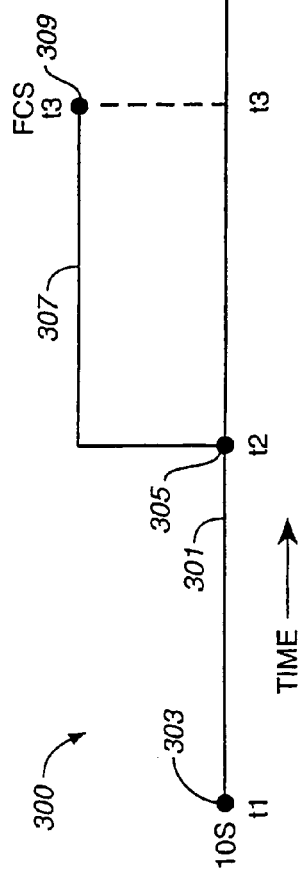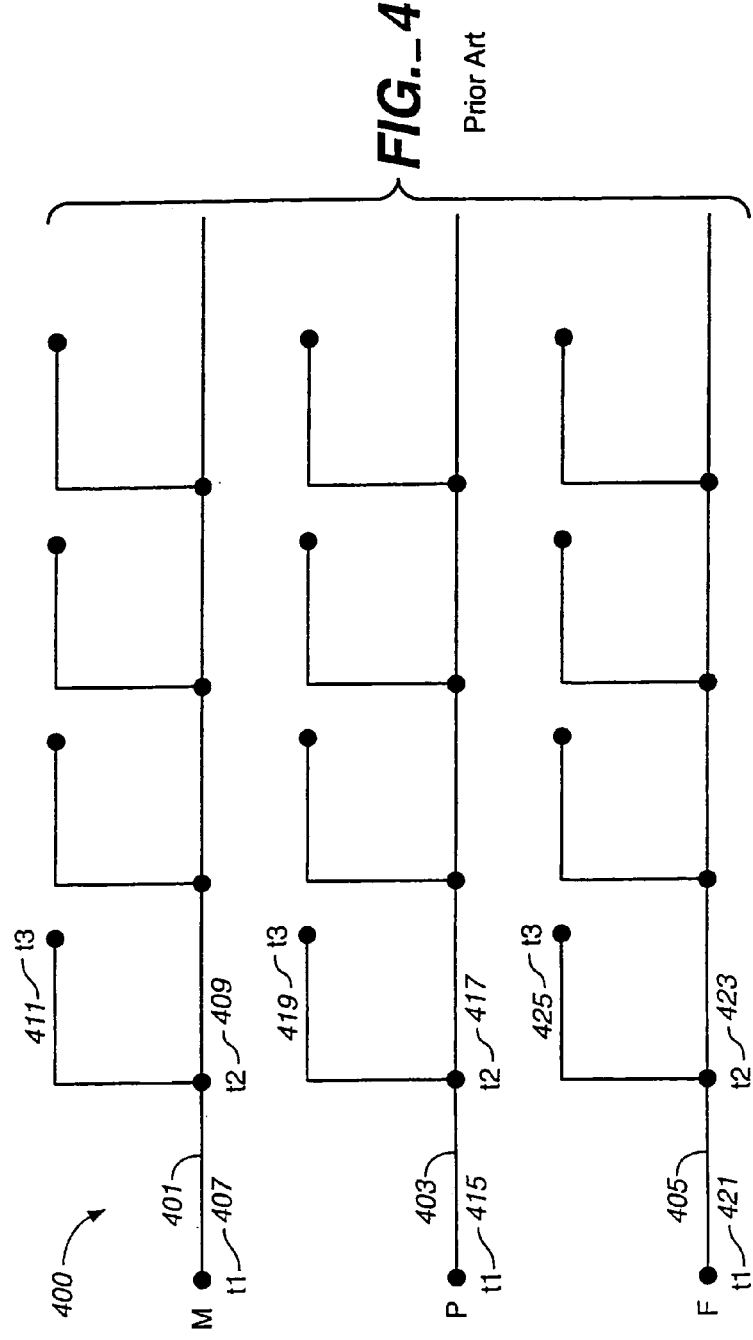
FIG._3
FIG._4 Prior Art

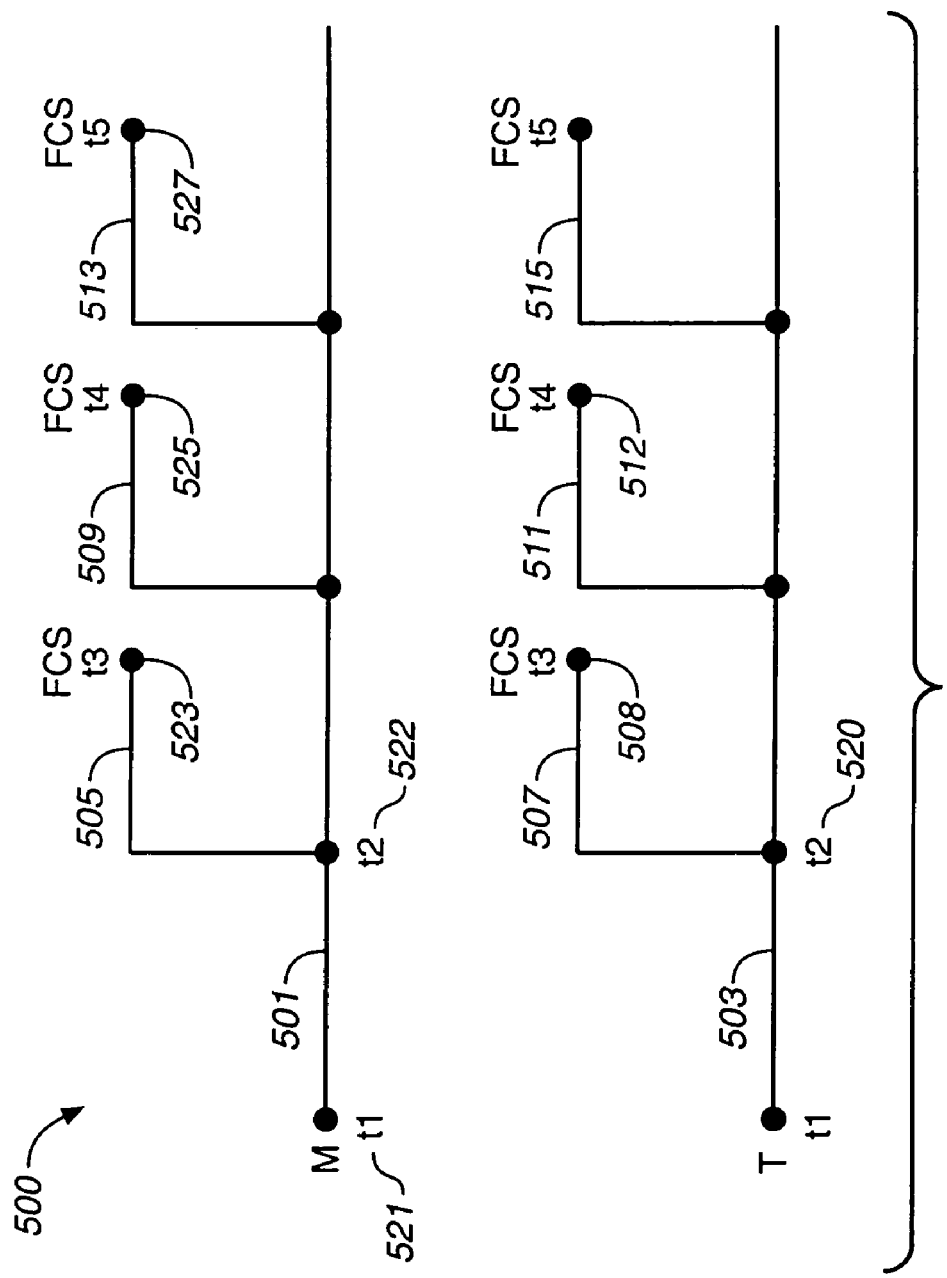
FIG._5

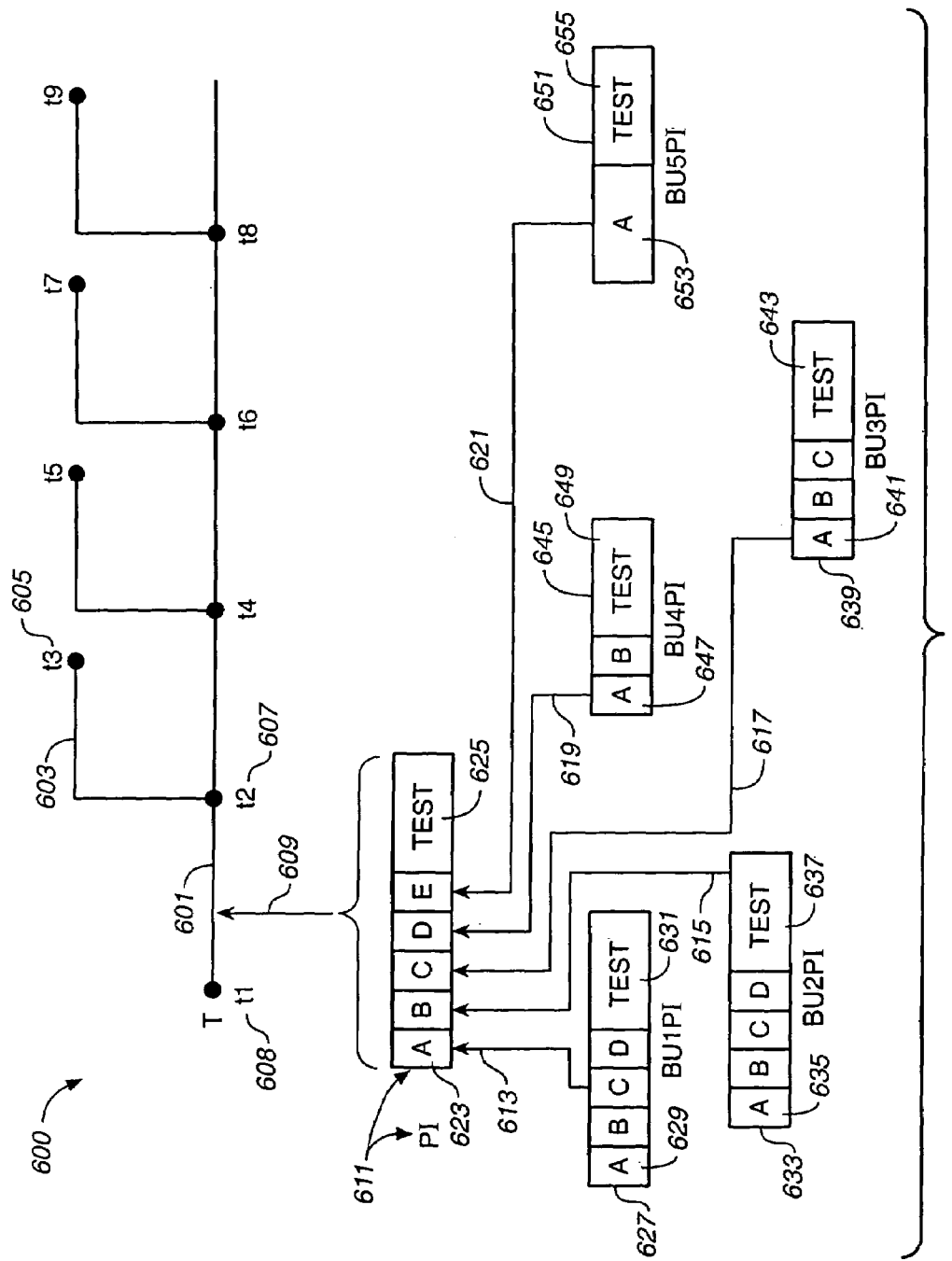
FIG._6

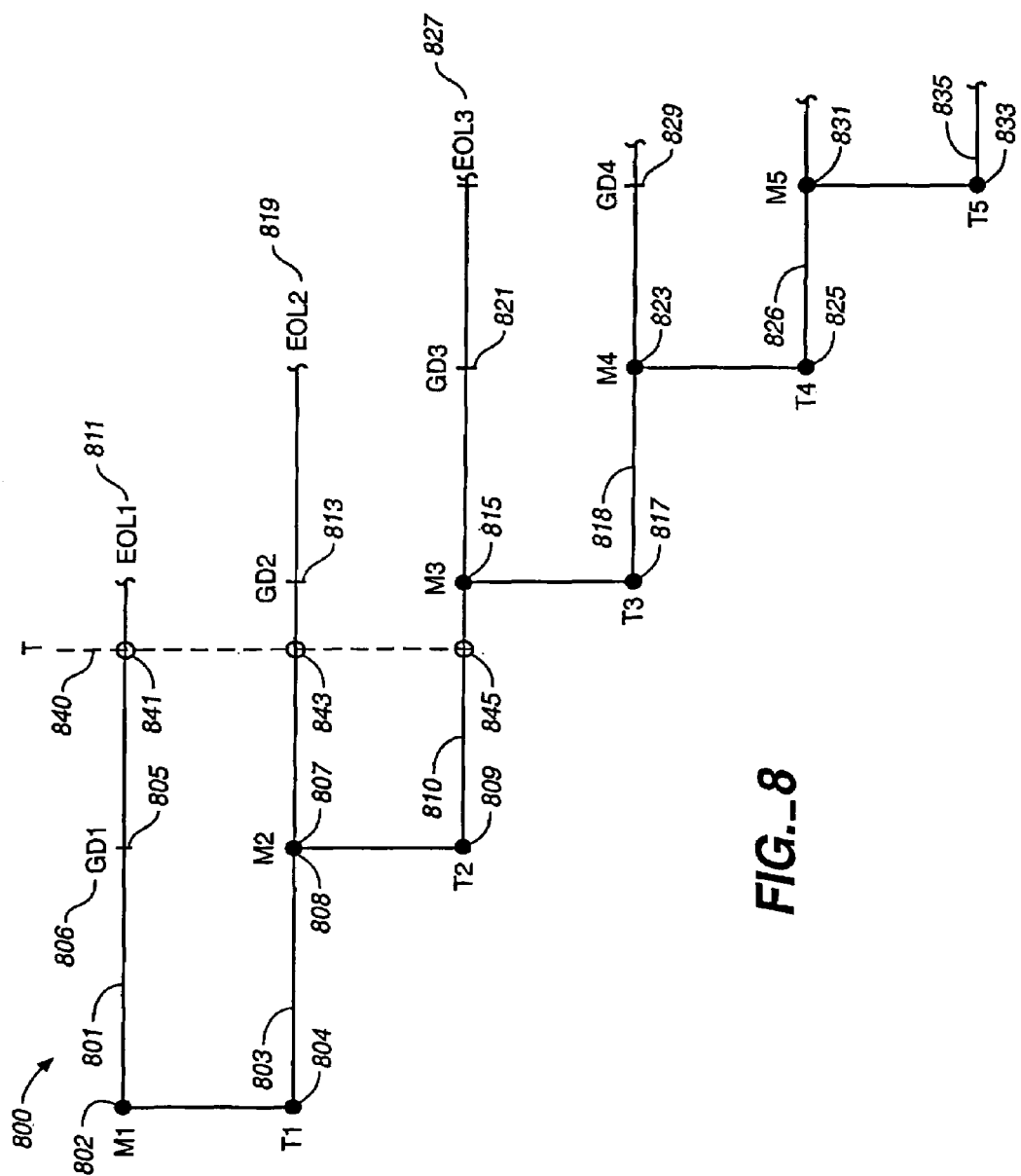
FIG._8

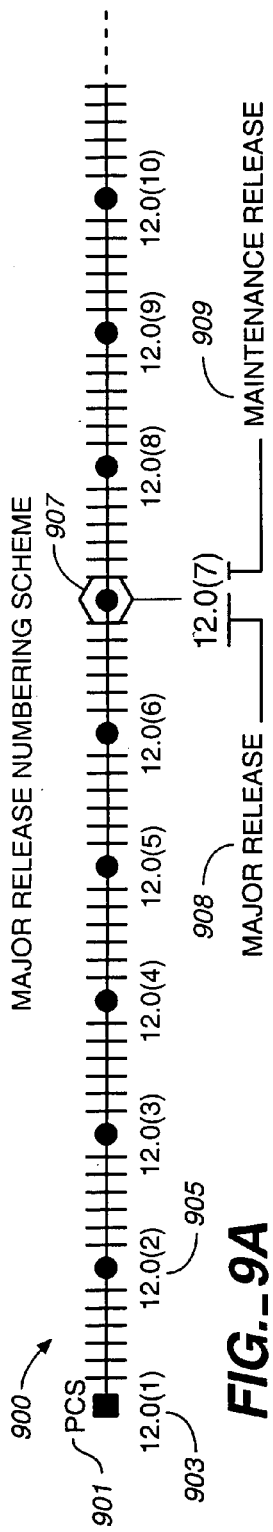
FIG._9A
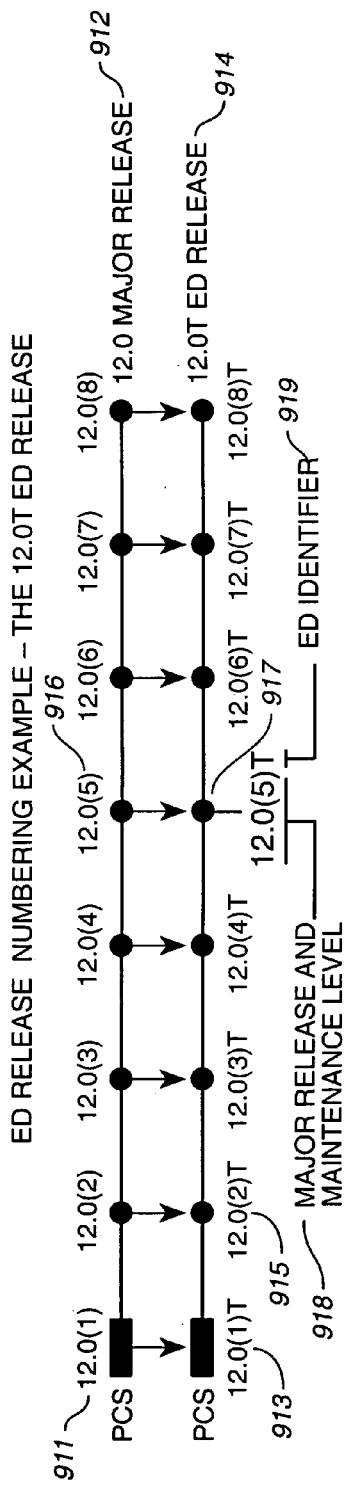
FIG._9B
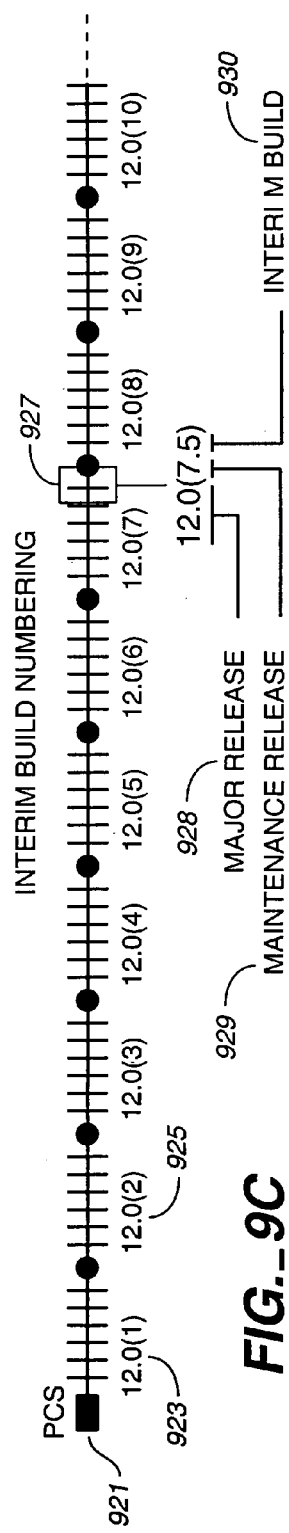
FIG._9C

METHOD AND SYSTEM FOR A SOFTWARE RELEASE PROCESS

CROSS-REFERENCE TO RELATED APPLICATIONS

*

TECHNICAL FIELD

This invention relates to the field of source code control for computer software development. More particularly, the present invention relates to a method and system for using structured testing and construction processes to produce a new release of a software system in an environment requiring frequent system releases.

BACKGROUND ART

Typically in a large software development project, many programmers or programming groups work in conjunction with one another to develop a single piece of software. Moreover, in today's distributed environment, using local area networks (LAN) as well as wide area networks (WAN), these various programmers and programming groups may be spread around the world.

In the past, source code management software has been developed to provide an efficient means for coordinating and documenting the programming activities of such a development group. Early versions of these systems were the Source Code Control System (SCCS), and the Revision Control System (RCS). Other systems are described in detail in U.S. Pat. No. 5,481,722 issued Jan. 2, 1996 titled "Method and Apparatus for Merging Change Control Delta Structure Files of a Source Module from a Parent and a Child Development Environment"; in U.S. Pat. No. 4,912,637 issued Mar. 27, 1990 titled "Version Management Tool"; and in U.S. Pat. No. 4,558,413 issued Dec. 10, 1985 titled "Software Version Management System." The systems described in these patents focused primarily on the version control problem in the context of relatively small programs and system usage in relatively small local development groups.

In today's hectic technology environment, software developers rush to get original product releases to market, followed by the inevitable "bug-fix" revisions, new feature releases, and extensive upgrades in a never ending cycle. Extensive use of Object Oriented Programming (OOP) techniques have added several levels of complexity to the configuration management task. Some large hardware companies, whose products sales are dependent on related software supporting new hardware features, add an additional pressure on software developers to rapidly modify existing software and produce releases of the operating system containing support for the new hardware features. Such shorter release cycles increase the need for development groups to engage in parallel development. However dividing project efforts among multiple developers or teams can lead to problems with software integration, reoccurring bugs, and lost changes. The requirement to maintain control of the source code in all of these releases amid continuing development is even more critical than in the past. In addition, such an environment of complex software, multiple platforms, globally dispersed development groups has required software configuration management systems which have process management functions embedded within the software configuration management tools. Process management functions are needed which include configuration control, version control, and also control of the procedures for sophisticated build/release functions, web object management functions and development and deployment functions.

Moreover, to satisfy the differing requirements of different customers in the exploding telecommunications market, it is required for manufacturers of network switches and routers as well as other devices to offer different operating system images containing different platform specific capabilities as well as different non-platform-specific features and protocols. Businesses which manage Internet and Intranet networks are constantly seeking less expensive equipment such as switches, routers, servers and client terminals. Such demands for less expensive equipment drives manufacturers to constantly create new and more desirable platforms. At the same time many of these businesses are simultaneously seeking new features which are platform independent to accommodate the exploding demands of their customers. Such demands included desires for more bandwidth, faster transmission protocols, more content security features such as cryptographic protocols, etc., etc. At the same time these businesses do not desire to pay for features which they do not need or want if at all possible. To accommodate such requirements, systems manufacturers develop "products" which contain separate combinations of such non-platform-specific features, which sell for various prices and which users can select for their particular platforms.

Such demands for new hardware platforms and new telecommunications features have led telecommunications systems suppliers such as Cisco Systems, Inc.™ (the assignee of the present invention) as well as others, to develop a sales strategy which dictates frequent releases of new hardware platforms and new feature software. This process places enormous pressure on the software developers to design, code and test new software to support the new hardware platforms and the new features, including protocols, and other special system features. All of these new software capabilities must ultimately be folded into the common Internetworking Operating System (IOS) which runs on all of the applicants switches and routers.

The technical problem addressed by the current invention relates to this issue of how to control the frequent release of new images of an operating system which contains new code for new hardware platforms, for various combinations of non-hardware-specific new features, while at the same time incorporating bug-fixes, and maintaining the highest quality of software possible through rigorously controlled testing, commit procedures and version management.

Some manufacturers of telecommunications devices have handled the problem of new feature control by putting all features possible in devices with infrequent releases and with mechanisms for cryptographically determining which features a customer is authorized to use. Such a system is described in U.S. Pat. No. 5,499,295 issued Mar. 12, 1996 Titled "Method and Apparatus for feature Authorization and Software Copy Protection in RF Communications devices." However, such a system does not support an environment where new and less expensive hardware becomes available continuously and wherein new features are developed continuously. The business problem of capitalizing on the frequency of these new platforms and features requires a frequency of new supporting software releases never seen before.

There is a need in the art for a method and system for orderly release of new versions of software frequently (as often as every 8 weeks), wherein the new versions contain code of the highest quality for a multiplicity of hardware platforms and a multiplicity of non-platform specific new features.

SUMMARY OF THE INVENTION

The present invention provides a solution to the needs described above through a system and method of using highly structured program testing, regression testing, final test and fix procedures and commit procedures at the levels of the Business Unit, at an intermediate pre-integration branch level and finally at a primary technology branch of the current IOS source code system before final system testing is performed as an antecedent to a regular release of a new version of the IOS regularly, approximately every 8 weeks. Moreover, in the preferred embodiment which incorporates this rigorous process, no more than three generations of the main branches of the IOS source code are maintained at any one time.

A system is disclosed for providing early deployment releases of a software system, the early deployment releases containing support for new features and platforms and new early deployment releases being generated on a regular recurring basis for a fixed number of release cycles.

Also disclosed is a method for a release control process having steps of generating a special early development branch of the operating system source code file, incorporating into the early development branch pre-tested modules reflecting support for new features and platforms, testing these new modules and generating a new early development release on a regularly recurring basis for a fixed number of cycles.

Still other embodiments of the present invention will become apparent to those skilled in the art from the following detailed description, wherein is shown and described only the embodiments of the invention by way of illustration of the best modes contemplated for carrying out the invention. As will be realized, the invention is capable of modification in various obvious aspects, all without departing from the spirit and scope of the present invention. Accordingly, the drawings and detailed description are to be regarded as illustrative in nature and not restrictive.

BRIEF DESCRIPTION OF THE DRAWINGS

The features and advantages of the system and method of the present invention will be apparent from the following description in which:

FIG. 3 illustrates a representative diagram used in this application to depict a basic Internetwork Operating System (IOS) source code tree structure which illustrates a main branch, a control branch and the release point for a new version.

FIG. 4 illustrates a block diagram of the prior art process of new version preparation showing the relationship of the main maintenance branch of the source code file, the related new platform source code branch and the related non-platform-specific-new-feature source code branch.

FIG. 5 illustrates a block diagram of the current process for new IOS version creation showing the relationship of the main maintenance source code branch to the Technical branch which incorporates both platform-specific code and non-platform-specific feature code.

FIG. 6 illustrates a block diagram of a more detailed view of the current process for new IOS version creation showing the relationship of the Technical branch which incorporates both platform-specific code and non-platform-specific feature code to a special "Pre-installation" (PI) source code branch, which itself is related to several Business Unit PI sub-branches.

FIG. 8 illustrates a diagram showing the relationship between successive maintenance and technical branches of the IOS source code system.

FIGS. 9a through 9c illustrate diagrams showing the basic release numbering scheme used in the preferred embodiment.

DETAILED DESCRIPTION OF THE INVENTION

Figure 1:
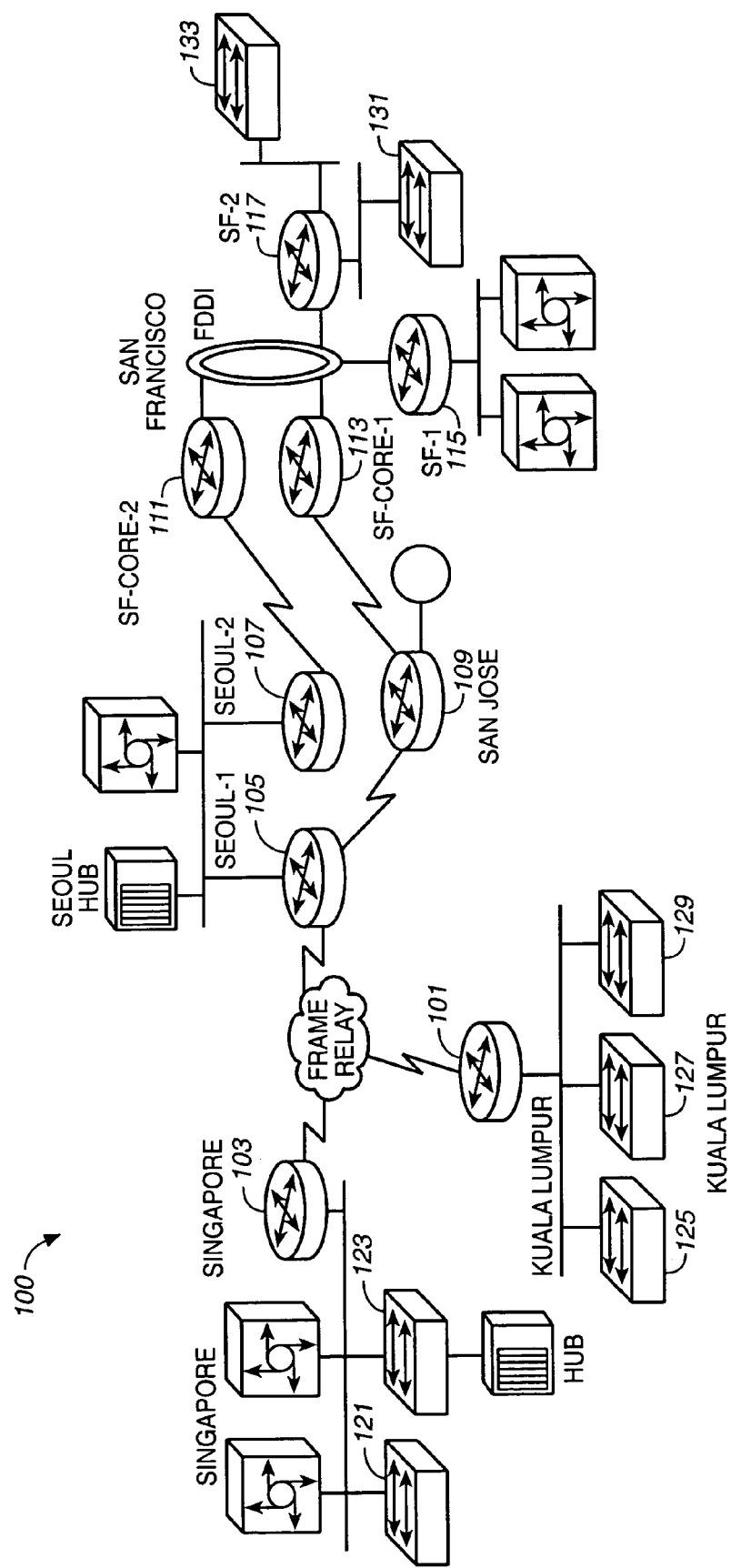
FIG. 1 illustrates an exemplary internetwork which illustrates the use of switches and routers.

The present invention provides a solution to the needs described above through a system and method of using highly structured program testing, regression testing, final test and fix procedures and commit procedures at the levels of the Business Unit, at an intermediate pre-integration branch level and finally at a primary technology branch of a current source code system before final system testing is performed as an antecedent to a regular release of a new version of the software regularly, as frequently as every 8 weeks. Moreover, in the preferred embodiment which incorporates this rigorous process, no more than three generations of the main branches of the software source code are maintained at any one time.

In the following description for purposes of explanation, specific data and configurations are set forth in order to provide a thorough understanding of the present invention. In the presently preferred embodiment the Internetworking Operating System (IOS) release process is described in terms of a client system using the invention in connection with a Reliant™ ClearCase™ configuration management system. However, it will be apparent to one skilled in these arts that the present invention may be practiced without the specific details, in various software configuration management applications, using any number of modern software configuration management systems. In other instances, well-known systems and protocols are shown and described in diagrammatical or block diagram form in order not to obscure the present invention unnecessarily.

Additional Background Information

Basic system related definitions which are not defined elsewhere in this document and which are used herein include the following:

A bridge is a network device that operates on the "data link layer" (a layer in the OSI Reference Model). A bridge connects multiple data link network segments into a single logical network segment. A Cisco Internetworking Operating System (IOS) image resides in a bridge and implements various types of bridging protocols.

A switch is a multiport bridge that also runs the IOS. A switch may have more ports that a bridge, cost less per port than a bridge, and possess embedded management functions that a bridge does not have.

A router is a device that detects packets through the network based on network layer information. A router understands the network layer addressing (based on various kinds of network layer protocols such IP, IPX, AppleTalk, etc.) in a packet and uses routing protocols to determine the route that a packet should take to reach its destination. All of these functions are also controlled by a version of the IOS in the router.

A bridge or switch connects two or more physical networks into a single logical network, while a router connects two or more logical networks and routes between them using information that is built by routing protocols and kept in routing tables.

A release is a version of a software system that is produced, usually in object code form, for delivery to a customer. As used herein, the term "release" has two meanings. "Release" can refer to the first shipment of a product, along with all its subsequent maintenance updates. For instance, 12.0(1), 12.0(2), 12.0(3) and all subsequent maintenance updates are collectively called the "12.0 Release." A particular maintenance update can also be called a "release," as in the "12.0(3) release." In this document, "Release" with a capital "R" indicates the first encompassing usage, and "release" with a small "r" indicates the second more narrow usage.

Types of Releases. There are two main types of Cisco IOS Software releases: Major Releases, which support a fixed set of features and platforms through the life of the release; and Early Deployment Releases, which deliver support for new features and platforms in their regular maintenance updates.

General Deployment

When a Major Release is deemed appropriate for general, unconstrained use in customers' networks, it is said to have reached General Deployment (GD). While all releases undergo significant internal and external testing prior to FCS, a vendor is typically unable to anticipate and test all customer network configurations. For that reason, the initial releases of software deployed in customer networks is closely monitored to ensure that it meets customers' needs, and fixes to the software are delivered via regularly scheduled maintenance releases. Thus early releases of such software have some risk of failure until it has been in full use in various customer environments for a period of time. In the preferred embodiment a release meets the GD milestone (and accordingly has minimum risk of failure) when Cisco is satisfied that the release has been:

Proven through extensive market exposure in diverse networks

Quantified with metrics analyzed for stability and bug trends

Qualified through customer satisfaction surveys

Once a maintenance update for a particular Major Release achieves GD, all subsequent maintenance updates for that Release are also said to be GD.

Early Deployment Releases (ED) as a group are based on Major Releases of IOS Software. In the preferred embodiment, ED Releases are a vehicle to quickly deliver new functionality, addressing the need for early availability of product. These Releases provide new technologies for customers to deploy in a limited manner in their networks.

Note that similar functionality may be available on more than one ED Release. For example, a platform may be introduced initially on the 11.1AA Release. Support for this platform may also be included in an ED Release based on 11.2, say the 11.2P Release. Since 11.2P is based on the 11.2 Major Release, the platform will support additional 11.2 features when deployed on the 11.2P Release. (See below for an explanation of Early Deployment Release numbering.)

In the preferred embodiment, Maintenance updates for an ED Release usually deliver support for additional platforms or features, beyond what was available at the Release's FCS. While the addition of platforms and features at maintenance releases can have a destabilizing effect on the release, Early Deployment maintenance releases are subject to the same level of testing as the maintenance releases for Major Releases.

In the preferred embodiment, Maintenance updates for an ED Release also deliver bug fixes. As shown in the figures below, maintenance work performed on the Major Release is brought forward to the ED release. Bugs present at the FCS of the Major Release are thus corrected in subsequent maintenance releases of any ED Release based on that Major Release, as well as in maintenance releases of the Major Release. Bugs found in an ED release are analyzed to determine whether they originated in that ED Release, or in the underlying Major Release. If a bug originated in the Major Release, it is corrected in both the Major Release and the ED Release.

In summary, maintenance releases for an ED Release may deliver any or all of the following:

Bug fixes for the Major Release-based features on which the ED is based

Bug fixes for the ED-unique features

Support for additional platforms or features

Early Deployment Release Numbering

The Early Deployment Release number identifies the Major Release and maintenance level, in addition to information unique to the ED Release. In general, Early Deployment Releases are differentiated from Major Releases by the use of capital letters in their names. For instance, 11.2 is a Major Release, whereas 11.2P and 11.2BC are Early Deployment Releases.

Example—The "12.0T" ED Release

In FIG. 9 below, there is an ED Release called 12.0T 914 which is based on the Major Release 12.0. 912 Underlined is a specific maintenance release for 12.0T, numbered 12.0(5)T 927. This number indicates the following:

The 12.0T Release 914 is based on 12.0 912.

The 12.0(5)T 927 maintenance release has incorporated all bug fixes which have been made to the 12.0 Release through the fifth maintenance release—It is equivalent to 12.0(5) 916 with respect to maintenance activity on the 12.0 code base.

The 12.0(5)T 927 maintenance release includes any additional functionality and bug fixes introduced on previous maintenance releases of the 12.0T Release.

The 12.0(5)T 927 maintenance release may include new functionality not previously introduced in maintenance releases of the 12.0T Release.

Interim Builds

As part of the normal development process, interim builds incorporating bug fixes are created between maintenance releases. Each interim build is usually tested in a limited manner. Fixes in the interim builds are incorporated in the subsequent maintenance release, which is fully regression tested. Numbering of interim builds is also shown in FIG. 9, for example the interim build system designated 12.0(7.5) 927 wherein the 12.0 refers to the major release involved 928, the 7 refers to the maintenance release 7 929 or more specifically 12.0(7), and the 0.5 refers to the interim build designator 930.

Commit means to formally submit code to the code base.

Regression Testing means testing to insure that committed code has not caused failures to previously submitted code.

A branch is generally, a specified configuration of source code files. The first configuration of a new release is generally designated the Main Branch or Parent branch. Subsequently subsets or supersets of this Main Branch may be created and will be called by a specific name, such as a "maintenance Branch" or a "Throttle Branch" or an "early development release" branch.

The Operating Environment of the Preferred Embodiment

The environment in which the present invention is used encompasses the development of operating system program images for network switches and routers manufactured and sold by Cisco Systems Inc.™, the assignee of the present invention. These switches and routers are used in the general distributed computing scene which includes generally local area networks with hubs, routers, gateways, tunnel-servers, applications servers, etc. connected to other clients and other networks via the Internet. Some of the elements of a typical internet network configuration are shown in FIG. 1, wherein an example Internetwork is shown. This example Internetwork is taken from the book titled "Cisco Router Configuration" by Allan Leinwand, Bruce Pinsky and Mark Culpepper, published by Macmillan Technical Publishing, Indianapolis, Ind. 46290 for Cisco Press, ISBN: 1-57870-022-1, which is hereby incorporated fully herein by reference. Referring to FIG. 1 the example internetwork 100 pictures a number of routers 101, 103, 105, 107, 109, 111, 113, 115 and 117 in various portions of the network located in a number of different physical locations. It is to be noted that each of these routers contains a Cisco Internetwork Operating System (IOS) and each of these platforms may have different platform-specific features as well as different non-platform-specific features. Similarly, a number of Cisco switches 121, 123, 125, 127, 129, 131 and 133 are shown in various locations. These switches also contain a Cisco Internetwork Operating System (IOS) and each of these platforms may have different platform-specific features as well as different non-platform-specific features.

Figure 2:
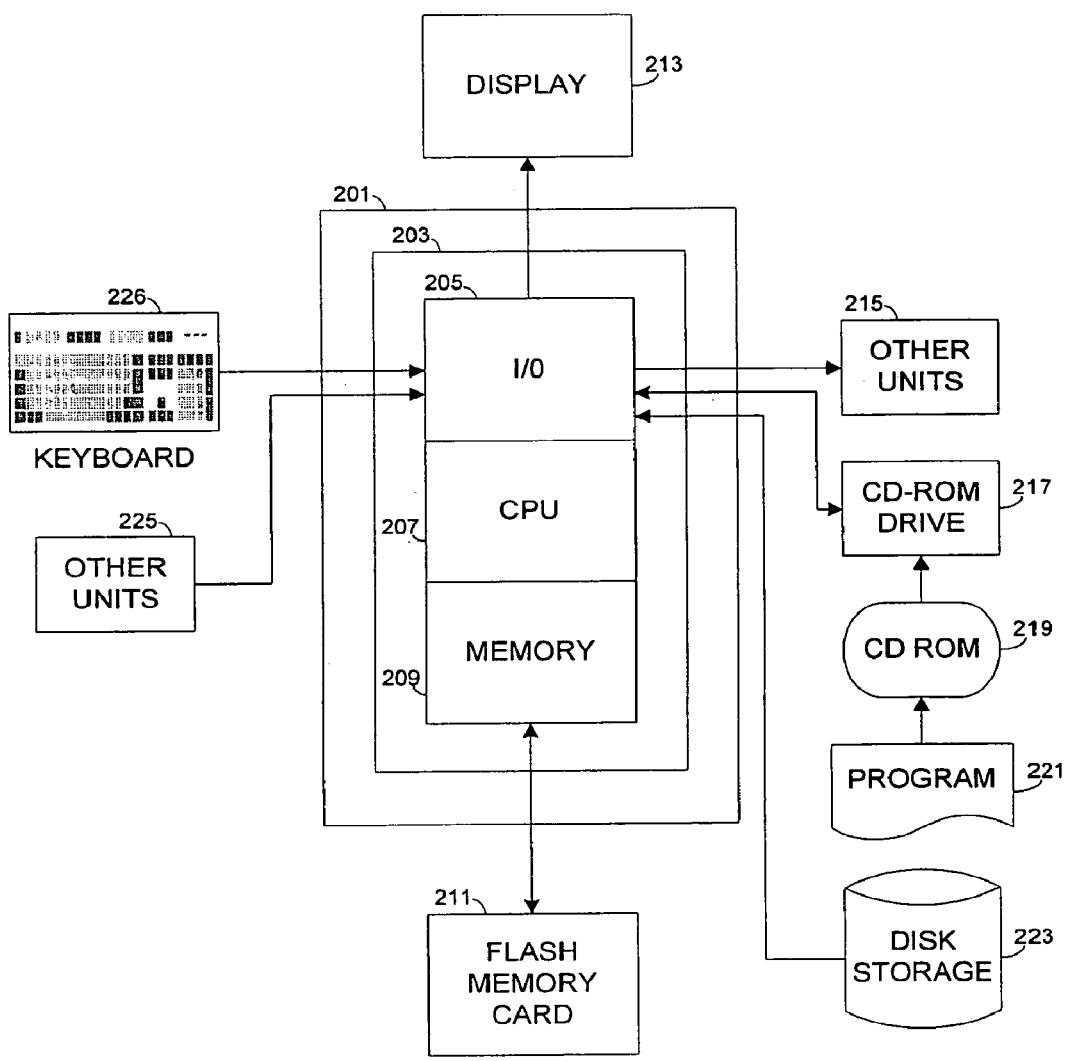
FIG. 2 illustrates a representative general purpose computer client configuration.

Portions of the present system may be performed using a general purpose computer unit which typically includes generally the elements shown in FIG. 2. The general purpose system 201 includes a motherboard 203 having thereon an input/output ("I/O") section 205, one or more central processing units ("CPU") 207, and a memory section 209 which may have a flash memory card 211 related to it. The I/O section 205 is connected to a keyboard 226, other similar general purpose computer units 225, 215, a disk storage unit 223 and a CD-ROM drive unit 217. The CD-ROM drive unit 217 can read a CD-ROM medium 219 which typically contains programs 221 and other data. Logic circuits or other components of these programmed computers will perform series of specifically identified operations dictated by computer programs as described more fully below.

A preferred embodiment of the present invention will be described in terms of a UNIX™ Workstation with the Solaris™ operating system and the assumption is that the workstation has at least a minimum configuration as follows:
Sun™ SPARC™ 5
SunOS 5.5.1
96 megs memory
170 MHz cpu.

This workstation is used primarily for the display and control commands while the system control software may be running on one or more servers, similarly running SunOS 5.5.1 with various amounts of memory and processor speeds. Those skilled in these arts will recognize that the invention can be run on any number of processors with relatively equivalent services and will provide more or less efficient testing depending on the processor and memory characteristics of the machines used.

In the preferred embodiment, the basic multi-site software configuration management system used with the invention is the ClearCase™ system developed by Rational Software Corporation™ of Cupertino, Calif.

Details of the Preferred Embodiment

Referring now to FIG. 3 some additional key concepts used in the following description of the preferred embodiment are outlined. In the general case discussion, a chart 300 such as is shown is used. The line 301 depicts the "main branch" starting at some time "t1." 303 As time progresses, new platform specific code and new feature code are added and tested as well as changes made to this source code file to add bug-fixing code to this baseline configuration 301. Typically at some time "t2" 305 a new branch 307 (call it a "throttle branch") is created wherein only bug fixes are added and tested thereafter. Additionally, during the period t2–t3 any bug-fix code inserted into the main branch is also inserted into the throttle branch and tested there as well. Ultimately, when the new code in the Throttle branch has been tested as thoroughly as practicable, this version is "released" to the customers at time t3 and this release event is typically called a "First Customer Shipment" (FCS) 309 of this particular configuration.

For example, FCS for major release of the IOS number 12.0 was on Jan. 11, 1999. This type of chart is depicted in the discussion of the preferred embodiment which follows.

Referring now to FIG. 4 some additional background is described to assist in understanding the nature of the technical problem involved in trying to control frequent releases of operating system software wherein on-going bug-fixes are implemented as well as new platform specific features and new non-platform-specific features in various combinations. Prior to the development of the system and method of the present invention, a system 400 used for controlling the process is shown in FIG. 4. In FIG. 4 the main branch 401 of a particular IOS configuration is shown. At time t1 407, 415 and 421 development branches designated "P" branch 403 and "F" branch 405 are created. In the system used with these branches the on-going bug-fixes being made routinely over time into the parent main branch 401 were to be routinely incorporated into the child branches "P" 403 and "F" 405. The P Branch 403 was to be used for incorporation and testing Platform specific changes and additions, whereas the F branch 405 was to be used for making non-platform-specific Feature changes. This arrangement did not work to meet the release objectives. These were: first to make a release every 8 weeks, the release being of the highest quality possible; and second to incorporate a maximum number of new platforms and new features as possible in the release.

It was not possible to achieve these objectives with the scheme 400 shown. There were different development groups working on and managing branch F 405 and branch P 403. Bug-fixes made to the main branch 401 were passed down to the P 403 and F 405 branches. However new feature code and their bug-fixes in the P 403 and F 405 branches were not adequately passed to each other in a way which made further testing of the new code and regression testing of the entire development branch possible. Ultimately in this scheme the F branch 405 was never able to keep up and it was not possible to assure that all features had been tested on all platforms. The 8 week release schedule simply made it impossible to do the testing and integration and final test between the P and F branches.

The Invention.

The preferred embodiment of the current invention is now described with reference to FIGS. 5–8. Referring now to FIG. 5, in contrast to the scheme shown in 400 a new scheme 500 is used which is made up of two primary branches: an M branch 501 and a child branch called a T (for technology) branch 503. The T branch 503 is used for both platform specific new features and non-platform-specific new features. Their insertion in to this T branch, their testing and the regression testing is all performed by the same development team so that the coordination of features present and testing control is better performed. As indicated before bug-fixes for source code files in the Main branch 501 are also made weekly in the T branch 503. In this scheme, at time t2 520 a throttle branch 507 is created off of the T branch 503 and no further code additions are made to this throttle branch 507 except for critical (show-stopper) bug-fixes while final testing of all features in this branch continues. At time t3 508 this branch becomes the next maintenance release version (say release 12.0(1)T) and is shipped the customer (i.e. FCS). Actually, the release is made publicly available for download by customers from the applicant's released software server. This process is repeated and the next maintenance release (FCS) occurs at time t4 512 where the difference in time between t3 508 and t4 512 is 8 weeks.

While this scheme 500 of having only one branch (the T branch 503) for combined/coordinated testing of both platform-specific features and non-platform-specific features provides better testing control, the 8 week cycle for releases was still found to be inadequate to accommodate all of the new features which were being pushed for release by the various business units. In order to maintain the primary goal of making a new release every 8 weeks with the highest quality possible, it was found necessary to develop a selection criteria for available features and to alternate the size of successive releases (that is number of features in a release). The selection criteria for new features to go into the next release was developed around three factors: Readiness; Risk; and Revenue. Readiness in the sense of "is the development status of this new feature complete and ready for integration and testing with the main branch code." If it is a platform-specific feature a second question is "is the device hardware available for customers to make use of this new software?" Risk has to do with the complexity of this feature, its history of use if any and the basic size of the code base for this feature. Some features contain tens of thousands of lines of code. And the Revenue factor of the selection factor has to do with packaging those features in each release which maximize the company's revenue from the new features.

The revised feature selection criteria begins with a business management ranking of new features in terms of highest actual or strategic revenue. With this as a starting point, it has been determined that these selection criteria can be satisfied by the addition of a more structured testing regime (to optimize the readiness and risk factors with respect to the selection for a given release) and by the alternating of large and small (or as called in the preferred embodiment, "fat" and "thin") releases as a way to achieve maximum revenue with highest quality.

Figure 7:
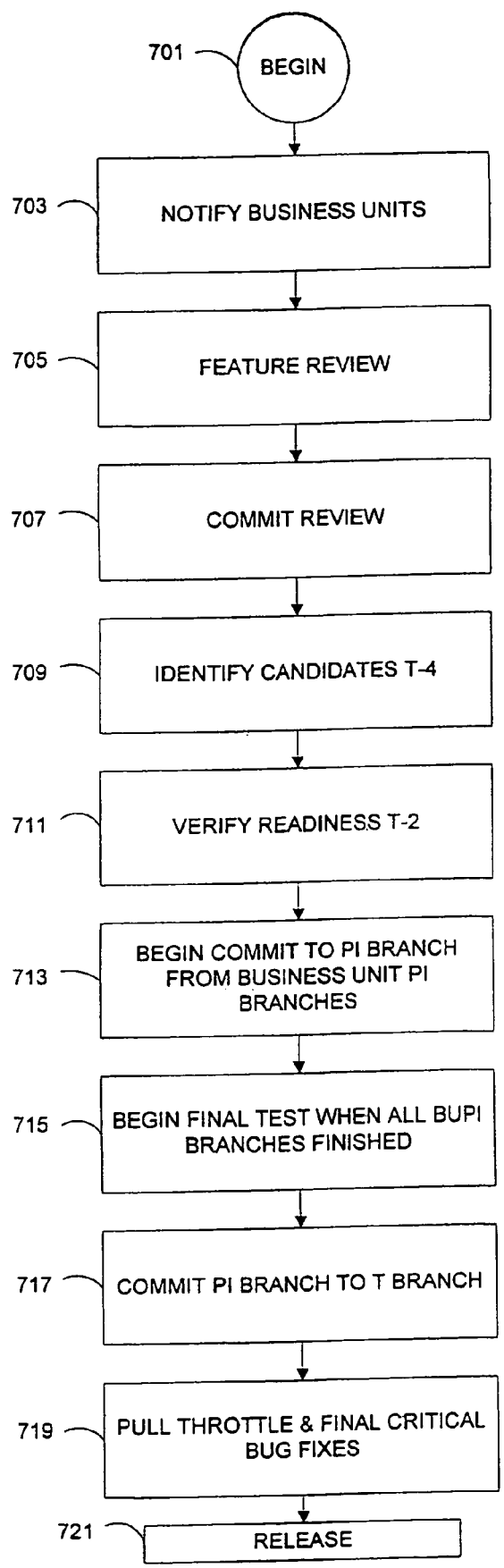
FIG. 7 illustrates a flow-chart of the preferred embodiment process for managing the process of creating a new IOS version release.

These features of the invention are now described with respect to FIGS. 6 & 7. Initially, the alternating fat and thin release process was developed because the number of candidate features in a given 8 week cycle was large enough so that time for adequate testing of all features in this release was not available since the final throttle branch integration testing required a minimum of 2 weeks independent of the number of features in the release. By alternating the quantity of features in successive releases it was found that a thin release (3–4 small features) could be integrated and fully tested in 3–4 weeks, thereby leaving an additional 4–5 weeks (that is 8 minus 3–4 equals 5–4) to add to the 8 weeks schedule of the next release. This additional 4–5 weeks of testing time in a fat release integration and testing cycle permits the addition of more features as well as the testing of larger and more complex features. Moreover the option of selecting ready features for inclusion in either a fat or thin release has helped to optimized the new feature revenue and maximum quality software in each release.

Referring now to FIG. 6 the structured testing regime 600 is shown. A T branch 601 is illustrated with the first throttle branch 603 occurring at time t2 607 with testing complete of this release cycle (FCS) occurring at t3 605. The time between this first new version release (FCS) at time t3 605 and the following FCS point at time t5 606 is 8 weeks. The first FCS release at t3 605 is depicted as a "fat" release with new features being provided by a number of business units. In this structured test cycle for the first release, a separate PI (for "Pre-Integration") branch 611 is created at time t1 608. This PI branch 611 is used to integrate the features from Business Unit 1 contained in BU1PI (a separate PI branch 627 for Business Unit 1), from Business Unit 2 contained in BU2PI 633, from Business Unit 3 contained in BU3PI 639, from Business Unit 4 contained in BU4PI 645 and from Business Unit 5 contained in BU5PI 651. In this structured system, the individual business units are required to demonstrate the "Readiness" of the features which they provide for the FCS release to occur at t3 605. For example, business unit 1 in its BU1PI 627 branch is shown to have four features (designated A, B, C and D) 623. Each of these features must be tested individually, tested in combination with each of the others and then all tested together 631 before they will be allowed into the PI branch 611. If they pass the Readiness and Risk criteria and are among the optimum revenue producers, they will be allowed into the PI branch 611 as a section 623 (here designated section A of the PI Branch). Similarly PI branches from other Business units must demonstrate their readiness to be included in the PI branch 611 for the upcoming FCS release. All business unit PI branches (here shown as 627, 633, 639, 647 and 651) are integrated into the PI branch 611 in what are called here "sections." This process must be completed with enough time to allow these sections to be tested with each other and then tested 625 all together. When this process is completed the PI branch 611 is integrated into the T Branch 601 at approximately 2 weeks prior to Throttle Pull at t2 607. Testing of the these new features within the confines of the T branch 601 continues along with periodic bug-fixes from the main branch (not shown in FIG. 6). At time t2 607 a throttle branch 603 is created for final testing with no additional code changes allowed except show-stopping bug fixes. Finally testing of this throttle branch 603 is completed with FCS release at time t3 605.

Referring now to FIG. 7 the new product release process 700 is summarized. In FIG. 7 the process related to a specific release (regardless of whether the particular release is a "Fat" or "Thin" release) begins by notifying the business units approximately 3 months prior to a scheduled release 703 that they must identify candidate features for release number KKK which is to begin testing at time T. Candidate features are reviewed relative to their strategic and revenue importance 705 and the status of their testing and readiness to commit their code 707 to the next release. At T–4 weeks the business units are asked to identify candidate features for the upcoming release 709. At T–2 weeks the business units are required to verify 711 that the features they previously identified are ready to be integrated into the PI branch. At time T, begin the commit to the PI branch from the Business unit PI branches 713. When all Business Unit PI branches have been committed into the PI branch, begin final testing of the combination of all features 715. At FCS release date minus YY weeks commit the PI branch into the T branch 717. Complete testing of the augmented T branch and create a throttle branch 719 at FCS date minus ZZ weeks. Complete testing on the throttle branch with only critical bug fixes allowed as additions during this time and release (FCS) this version of the IOS 721 for compilation and distribution of IOS images.

This structured release process, wherein new versions of the software product are released frequently, in an environment of a multiplicity of platform devices and a multiplicity of non-platform-specific features, and wherein the process maximizes the quality of the code in the release as well as the revenue generation potential from the feature base, is new and novel in the art. While the release frequency is 8 weeks in the preferred embodiment, those skilled in these arts will recognize that various release frequencies are possible. Shorter release cycles obviously lessen testing time as well as the number of features that can be accommodated in a given release. Longer release cycles provide more time for testing and integration and perhaps require fewer test and integration personnel, however there is a diminishing revenue potential from new feature support as the time cycle between releases increases. Those skilled in the art will recognize that the optimum release frequency will vary as a function of the availability of new hardware devices and new protocols and communications features desired by customers as well as with a vendors resources for developing, testing, controlling and releasing the new software to support these new platforms and features. In the preferred embodiment the release frequency is 8 weeks.

This structured testing and regular release process has further effects of permitting rigorous control of the number of active code bases that must be maintained for the IOS system. In the environment of the preferred embodiment of the invention only three active IOS release branches are maintained at any one time. Referring now to FIG. 8 the active IOS release environment 800 is further explained in terms of the relationship between maintenance or M branches of the code base and the technical development or T branch of the code base and the various "states" that a given IOS code branch goes through. For example, assume a maintenance branch exists designated M1 801. At a particular time (which will become clear below) 802 a new technical branch, designated T1 803 is created. During the time from 802 to 806 on the M1 branch 801 only bug-fixes are permitted. That is, no new platform or feature code are added to this branch during this time. The M1 branch 801 is said to be in the "Maturing" state during this period. During this same time period, which is designated as running from 804 to 808 on the T1 branch 803, all bug-fixes made to M1 801 are also made to T1 803 while new platform code and new non-platform-specific code are also added to T1 803 according to the process of the invention described above. During this period from 804 to 808 on the T1 branch 803, there will be approximately six of the 8 weekly cycle releases containing new platforms and new features. After the six releases of the T1 branch 803 with new features a "change state" event occurs wherein the M1 branch 801 becomes certified as being in the state called a "General Deployment (GD)" release 805, 806. After this time 806 the M1 release will only be modified with "high severity bug-fixes. Simultaneously with the designation of the M1 branch as GD1 806, the T1 branch 803 becomes designated as a new maintenance branch M2 807, 808. Also at this time a new development branch T2 809,810 is created. As indicated before with M1 and T1, the new M2 branch 807 is only modified with bug-fixes after the time at 808 and all new platform and features are added to the new T2 branch 810. This new maintenance branch M2 will ultimately be certified as GD 813 and the T2 branch 810, having had its six technology releases will become maintenance branch M3 815 and a new technology branch T3 817,818 will be created. Also at this same time, the original maintenance branch M1 801 is designated as being at "End-of-Life" (EOL) 811, 812. Thus it can be seen that a given IOS code branch goes through four states. First it is a Technology branch wherein new platforms and non-platform-specific features are added as they are developed and qualify for addition Second, after it has lived through six technology release cycles (that is, six of the 8 weekly cycle releases) it becomes a maintenance release wherein only bug-fixes are added in subsequent releases and it spins off a new technology branch. Third, it is certified as a General Development (GD) release of the highest reliability. And fourth, it reaches end-of-life in an orderly and time-dependent fashion. Accordingly only three of these IOS code branches are alive and maintained at any one time. Notice that the overlapping states provides a mechanism for giving a customer an orderly choice of IOS images. Referring again to FIG. 8 it will be clear that at any time "T" 840 a customer has a choice of an IOS image of maximum stability and reliability from the GD1 branch at 841, or an IOS image with more new features but yet in a relative mature reliability state for the M2 branch at 843, or if he wants the latest features and is willing to take some risks, he can choose an IOS image from the development branch T2 at 845. This regularized and well controlled system is only made possible by the underlying regulated and orderly new feature release process.

EXAMPLES

Figure 10:
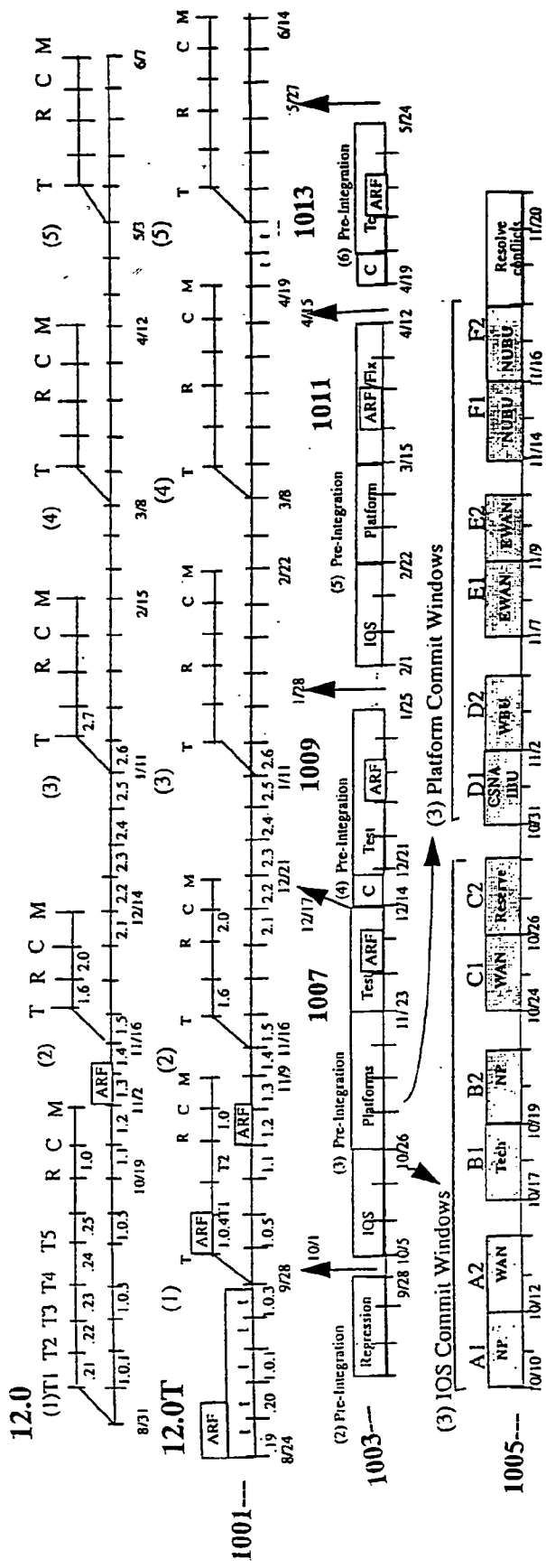
FIG. 10 illustrates a example diagram of the preferred embodiment showing the relationship between successive fat and thin releases of the IOS source code system.

FIG. 10 depicts an example of the use of the present invention, illustrating the relationship of the "fat" and "thin" alternating releases. In FIG. 10 the 12.0T technology branch 1001 is shown along with the related "Pre-Integration (PI)" branches. These include the PI branches for release 2 1003, for release 3 1007, for release 4 1009, for release 5 1011 and for release 6 1013. Notice that the odd-numbered alternate branches for release 3 1007 and release 5 1011 are "fat" releases each containing IOS features and platform features, whereas the even-numbered alternate branches for release 4 1009 and release 6 1013 are "thin" releases. This FIG. 10 further depicts a series of business unit supplied features 1005 for release 3 showing the relationship of the IOS and platform commit windows of PI branch for release 3 1007.

Having described the invention in terms of a preferred embodiment, it will be recognized by those skilled in the art that various types of general purpose computer hardware may be substituted for the configuration described above to achieve an equivalent result. Similarly, it will be appreciated that arithmetic logic circuits are configured to perform each required means in the claims for processing applications which process and control the software configuration of the various IOS branches described. It will be apparent to those skilled in the art that modifications and variations of the preferred embodiment are possible, such as different release frequencies as well as different selection criteria for which features may be included in a given release, al of which fall within the true spirit and scope of the invention as measured by the following claims.

What is claimed is:

1. A release control method for providing early deployment releases of a software system, the early deployment releases containing support for new features and platforms, the method comprising the steps of:
   a. providing an early development branch of the software system that is designated for incorporation of one or more software modules providing support for new features and platforms;
   b. receiving, from a plurality of integration units, a plurality of pre-tested software modules, wherein each of the pre-tested software modules comprises one or more new features or supports one or more new platforms;
   c. committing the pre-tested software modules for new features and platforms into the early development branch; and
   d. using the early development branch, generating a new early development release containing pre-tested software modules for new features and platforms;

wherein the pre-tested software module is received at a pre-integration branch that is separate from the early development branch, and wherein the committing step comprises committing pre-tested software modules for new features and platforms from a pre-integration branch into the early development branch.

2. A system for providing early deployment releases of a software system, the early deployment releases containing support for new features and platforms, comprising:
   a. an early development branch of the software system designated for incorporation of one or more software modules providing support for new features and platforms;
   b. logic for receiving, from a plurality of integration units, a plurality of pre- tested software modules, wherein each of the pre-tested software modules comprises one or more new features or supports one or more new platforms;
   c. logic for committing the pre-tested software modules for new features and platforms into the early development branch;
   d. using the early development branch, logic for generating a new early development release containing pre-tested software modules for new features or platfonns on a regular recurring basis for a fixed number of cycles; and
   e. logic for generating said new early development release containing pre- tested software modules for new features or platforms on a regular recurring basis for a fixed number of cycles;

wherein the logic for committing comprises logic for committing pre-tested software modules for new features and platforms from a pre-integration branch into the early development branch.

3. A release control method for providing early deployment releases of a software system, the early deployment releases containing support for new features and platforms, the method comprising the steps of:
   a. providing an early development branch of the software system that is designated for incorporation of one or more software modules providing support for new features and platforms;
   b. receiving, from a plurality of integration units, a plurality of pre-tested software modules, wherein each of the pre-tested software modules comprises one or more new features or supports one or more new platforms;
   c. committing the pre-tested software modules for new features and platforms into the early development branch;
   d. using the early development branch, generating a new early development release containing pre-tested software modules for new features and platforms;

receiving a plurality of software source code modules that support new features or platforms at a respective plurality of business unit pre-integration branches;
   committing one or more of the plurality of software source code modules from the one or more of the business unit pre-integration branches to a central pre-integration branch only when such testing is successful; and
   committing the plurality of software source code modules from the central pre-integration branch to the early development branch when all the modules have been committed from the business unit pre-integration branches to the central pre-integration branches.

4. A method as recited in claim 3, further comprising the step of generating, using the early development branch, a new early development release containing pre-tested source code for new features and platforms only when the plurality of software source code modules has been committed from the central pre-integration branch to the early development branch.

5. A release control method for providing early deployment releases of a software system, the early deployment releases containing support for new features and platforms, the method comprising the steps of:
   a. providing an early development branch of the software system that is designated for incorporation of one or more software modules providing support for new features and platforms;
   b. receiving, from a plurality of integration units, a plurality of pre-tested software modules, wherein each of the pre-tested software modules comprises one or more new features or supports one or more new platforms;
   c. committing the pre-tested software modules for new features and platforms into the early development branch;
   d. using the early development branch, generating a new early development release containing pre-tested software modules for new features and platforms;

receiving a plurality of software source code modules that support new features or platforms at a respective plurality of business unit pre-integration branches;
   at each business unit, testing each feature of the software source code modules of that business unit individually, in combination with each other feature individually, and in combination with all other features;
   committing one or more of the plurality of software source code modules from the one or more of the business unit pre-integration branches to a central pre-integration branch only when such testing is successful; and committing the plurality of software source code modules from the central pre- integration branch to the early development branch when all the modules have been committed from the business unit pre-integration branches to the central pre-integration branches.

6. A method as recited in claim 3, further comprising the step of generating, using the early development branch, a new early development release containing pre-tested source code for new features and platforms only when the plurality of software source code modules has been committed from the central pre-integration branch to the early development branch.

7. A computer-readable medium comprising one or more stored sequences of instructions for providing release control using early deployment releases of a software system, the early deployment releases containing support for new features and platforms, which instructions, when executed by one or more processors, cause the one or more processors to perform the steps of:
   a. providing an early development branch of a software release that is designated for incorporation of support for new features and platforms;
   b. receiving, from a plurality of integration units, a plurality of pre-tested source code modules, wherein each of the pre-tested source code modules comprises one or more new features or supports one or more new platforms;
   c. committing the pre-tested source code for new features and platforms into the early development branch; and
   d. using the early development branch, generating a new early development release containing pre-tested source code for new features and platforms.

8. A computer-readable medium as recited in claim 7 further comprising the steps of:
   receiving and testing a plurality of software source code modules that support new features or platforms at a respective plurality of business unit pre- integration branches;
   committing one or more of the plurality of software source code modules from the one or more of the business unit pre-integration branches to a central pre-integration branch only when such testing is successful; and
   committing the plurality of software source code modules from the central pre- integration branch to the early development branch when all the modules have been committed from the business unit pre-integration branches to the central pre-integration branches.

9. A computer-readable medium as recited in claim 8 further comprising the step of generating, using the early development branch, a new early development release containing pre-tested source code for new features and platforms only when the plurality of software source code modules has been committed from the central pre-integration branch to the early development branch.

10. A computer-readable medium as recited in claim 7, further comprising the steps of:
    receiving a plurality of software source code modules that support new features or platforms at a respective plurality of business unit pre-integration branches;
    at each business unit, testing each feature of the software source code modules of that business unit individually, in combination with each other feature individually, and in combination with all other features;
    committing one or more of the plurality of software source code modules from the one or more of the business unit pre-integration branches to a central pre-integration branch only when such testing is successful; and
    committing the plurality of software source code modules from the central pre- integration branch to the early development branch when all the modules have been committed from the business unit pre-integration branches to the central pre-integration branches.

11. A computer-readable medium as recited in claim 8 further comprising the step of generating, using the early development branch, a new early development release containing pre-tested source code for new features and platforms only when the plurality of software source code modules has been committed from the central pre-integration branch to the early development branch.

12. A system for providing early deployment releases of a software system, the early deployment releases containing support for new features and platforms, comprising:
    a. an early development branch of the software system designated for incorporation of one or more software modules providing support for new features and platforms;
    b. logic for receiving, from a plurality of integration units, a plurality of pre- tested software modules, wherein each of the pre-tested software modules comprises one or more new features or supports one or more new platforms;
    c. logic for committing the pre-tested software modules for new features and platforms into the early development branch;
    d. using the early development branch, logic for generating a new early development release containing pre-tested software modules for new features or platforms on a regular recurring basis for a fixed number of cycles;
    e. logic for generating said new early development release containing pre- tested software modules for new features or platforms on a regular recurring basis for a fixed number of cycles;
    receiving and testing a plurality of software source code modules that support new features or platforms at a respective plurality of business unit pre- integration branches;
    committing one or more of the plurality of software source code modules from the one or more of the business unit pre-integration branches to a central pre-integration branch only when such testing is successful; and
    committing the plurality of software source code modules from the central pre- integration branch to the early development branch when all the modules have been committed from the business unit pre-integration branches to the central pre-integration branches.

13. A system as recited in claim 12, further comprising the step of generating, using the early development branch, a new early development release containing pre-tested source code for new features and platforms only when the plurality of software source code modules has been committed from the central pre-integration branch to the early development branch.

14. A system for providing early deployment releases of a software system, the early deployment releases containing support for new features and platforms, comprising:
- a. an early development branch of the software system designated for incorporation of one or more software modules providing support for new features and platforms;
- b. logic for receiving, from a plurality of integration units, a plurality of pre- tested software modules, wherein each of the pre-tested software modules comprises one or more new features or supports one or more new platforms;
- c. logic for committing the pre-tested software modules for new features and platforms into the early development branch;
- d. using the early development branch, logic for generating a new early development release containing pre-tested software modules for new features or platforms on a regular recurring basis for a fixed number of cycles;
- e. logic for generating said new early development release containing pre- tested software modules for new features or platforms on a regular recurring basis for a fixed number of cycles;

receiving a plurality of software source code modules that support new features or platforms at a respective plurality of business unit pre-integration branches;

at each business unit, testing each feature of the software source code modules of that business unit individually, in combination with each other feature individually, and in combination with all other features;

committing one or more of the plurality of software source code modules from the one or more of the business unit pre-integration branches to a central pre-integration branch only when such testing is successful; and committing the plurality of software source code modules from the central pre- integration branch to the early development branch when all the modules have been committed from the business unit pre-integration branches to the central pre-integration branches.

15. A system for providing early deployment releases of a software system. the early deployment releases containing support for new features and platforms, compnsing;
- a. an early development branch of the software system designated for incorporation of one or more software modules providing support for new features and platforms;
- b. logic for receiving, from a plurality of integration units, a plurality of pre- tested software modules, wherein each of the pre-tested software modules comprises one or more new features or supports one or more new platforms;
- c. logic for committing the pre-tested software modules for new features and platforms into the early development branch;
- d. using the early development branch, logic for generating a new early development release containing pre-tested software modules for new features or platforms on a regular recurring basis for a fixed number of cycles;
- e. logic for generating said new early development release containing pre- tested software modules for new features or platforms on a regular basis for a fixed number of cycles; and generating, using the early development branch, a new early development release containing pre-tested source code for new features and platforms only when the plurality of software source code modules has been committed from the central pre-integration branch to the early development branch.

* * * * *

UNITED STATES PATENT AND TRADEMARK OFFICE
CERTIFICATE OF CORRECTION

PATENT NO. : 7,146,608 B1
APPLICATION NO. : 09/407531
DATED : December 5, 2006
INVENTOR(S) : Alan Newman et al.

It is certified that error appears in the above-identified patent and that said Letters Patent is hereby corrected as shown below:

Col. 14, line 19  After "receiving'" insert --and testing--

Col. 18, line 27  After "regular" insert --recurring--

Signed and Sealed this

Twelfth Day of June, 2007

JON W. DUDAS
*Director of the United States Patent and Trademark Office*